United States Patent [19]

Liu et al.

[11] Patent Number: 5,457,156

[45] Date of Patent: Oct. 10, 1995

[54] IMPACT-STRENGTH MODIFIERS FOR THERMOPLASTIC POLYMERS

[75] Inventors: Wan-Li Liu, Levittown; Susan M. Liwak, Langhorne, both of Pa.

[73] Assignee: Rohm and Haas Company, Philadelphia, Pa.

[21] Appl. No.: 237,079

[22] Filed: May 3, 1994

Related U.S. Application Data

[62] Division of Ser. No. 23,732, Feb. 26, 1993, Pat. No. 5,332,782, which is a continuation of Ser. No. 346,296, May 1, 1989, abandoned, which is a continuation of Ser. No. 900,878, Aug. 27, 1986, abandoned.

[51] Int. Cl.$^6$ .......................... C08L 51/00; C08L 51/06
[52] U.S. Cl. ......................... 525/74; 525/78; 525/80
[58] Field of Search .......................... 525/78, 74

[56] References Cited

U.S. PATENT DOCUMENTS

| | | | |
|---|---|---|---|
| 3,668,274 | 6/1972 | Owens et al. | 525/66 |
| 3,796,771 | 3/1974 | Owens et al. | 525/66 |
| 3,821,145 | 6/1974 | Walus | 525/78 |
| 3,845,163 | 10/1974 | Murch | 525/183 |
| 3,984,497 | 10/1976 | Owens et al. | 525/66 |
| 3,985,703 | 10/1976 | Graham et al. | 260/42.29 |
| 4,086,300 | 4/1978 | Owens et al. | 525/66 |
| 4,148,846 | 4/1979 | Owens et al. | 525/66 |
| 4,172,859 | 10/1979 | Epstein | 428/402 |
| 4,174,358 | 11/1979 | Epstein | 525/66 |
| 4,412,040 | 10/1983 | Wrozina et al. | 525/143 |
| 4,423,186 | 12/1983 | Binsack et al. | 525/66 |
| 4,440,905 | 4/1984 | Dunkelberger | 525/66 |
| 4,461,868 | 7/1984 | Lindner et al. | 525/67 |
| 4,463,131 | 7/1984 | Wagner et al. | 525/76 |
| 4,474,927 | 10/1984 | Novak | 525/66 |
| 4,478,978 | 10/1984 | Roura | 525/66 |
| 4,564,653 | 1/1986 | Kamata et al. | 525/67 |
| 4,584,344 | 4/1986 | Baer | 525/66 |
| 4,818,793 | 4/1989 | Matthies et al. | 525/183 |

FOREIGN PATENT DOCUMENTS

| | | |
|---|---|---|
| 8786487 | 8/1985 | Australia . |
| 168652 | 6/1985 | European Pat. Off. . |
| 3403576 | 2/1984 | Germany . |
| 6060158 | 9/1983 | Japan . |
| 998439 | 12/1963 | United Kingdom . |

*Primary Examiner*—Ana L. Carrillo
*Attorney, Agent, or Firm*—Darryl P. Frickey; Roger K. Graham

[57] ABSTRACT

An acrylic additive polymer containing free carboxylic acid groups is added to a core-shell impact-property modifier containing free carboxylic acid groups to produce an improved physical-property modifier for polyamide resins.

30 Claims, No Drawings

IMPACT-STRENGTH MODIFIERS FOR THERMOPLASTIC POLYMERS

This is a divisional application of U.S. Ser. No. 023,732 filed Feb. 26, 1993, now U.S. Pat. No. 5,332,782, which is a continuation of U.S. Ser. No. 346,296, filed May 1, 1989 (now abandoned) which was a continuation of U.S. Ser. No. 900,878, filed Aug. 27, 1986 (now abandoned).

This invention relates to an improved impact-property modifier for nylon and for other thermoplastic polymers, and to the process for preparing and isolating the modifier. More particularly, this invention relates to a polymeric additive for known impact-property modifiers, which improves powder-handling properties when such modifiers are spray-dried or coagulated from emulsion. The invention further relates to the process for preparing the improved impact-property modifier, the process for incorporating the improved modifier into thermoplastic polymers, and the thermoplastic polymers having improved impact properties which are so produced.

BACKGROUND OF THE INVENTION

Impact property modification of thermoplastic polymers by a variety of rubbers, elastomers, and rubbers combined with the thermoplastics has been known for many years. Extensive interest has been shown for at least 30 years in rubbers combined with thermoplastics in a core-shell structure, typically prepared by emulsion polymerization, as exemplified by such commercial combinations as acrylate-butadiene-styrene (ABS) or methacrylate-butadiene-styrene (MBS) impact-property modifiers for poly(vinyl chloride), acrylic/methacrylic core-shell modifiers for polycarbonate, and the like.

In the case of the amide polymers collectively known as nylons, such as nylon 6 (polycaprolactam), nylon 66 (poly(hexamethylene adipamide)), and the like, impact strength may be improved by reacting an acid or anhydride functionality on the impact-property modifier with an amine group available on the polyamide. Such functionalized modifiers include ethylene/acrylic acid copolymers (British Patent No. 998,439), metal-ion neutralized ethylene/unsaturated acid copolymers (Murch, U.S. Pat. No. 3,845,163), acrylic rubber//methyl methacrylate-co-unsaturated acid core-shell polymers as taught in Owens and Clovis, U.S. Pat. Nos. 3,66,274, 3,796,771, 3,984,497, 4,086,300 and 4,148, 846. Baer (U.S. Pat. No. 4,584,344) teaches modification with a core-shell polymer consisting of a crosslinked elastomer of particle size above 300 nanometers, with a shell containing a polymer of unsaturated carboxylic acid, styrene, and optionally a lower alkyl methacrylate and/or (meth)acrylonitrile. Impact-property modifiers which adhere to nylon, of particle size 0.01 to 3 micrometers (um) and of a tensile modulus 7–138,000 kilopascals (kPa) are disclosed in Epstein, U.S. Pat. No. 4,174,358, and similar modifiers are taught in German Offenlegungschrift 3,403,576. Polyamide-toughening reactive crosslinked acrylic rubbers having an outer layer of an alkyl acrylate and a polyamide reactive graft-linking monomer are disclosed in Novak, U.S. Pat. No. 4,474,927. Blends of nylon 6 and nylon 66 toughened with an ionic copolymer of an alpha-olefin with an unsaturated carboxylic acid, the acid moeity of which is at least partially neutralized with metal basic salts, are disclosed in Roura, U.S. Pat. No. 4,478,978. Such co-reacted modifiers may also improve the processing of the nylon, allowing melt strength sufficient for blow-molding, thermoforming, and the like. The modifiers of Owens and Clovis, above, particularly related to the present invention.

General problems with incorporating impact-property modifiers into thermoplastic polymers have been (1) the difficulty of obtaining uniform dispersion of the modifier throughout the matrix polymer and (2) breaking down aggregates of the modifier to a dispersed domain within the matrix polymer having optimum size for best impact resistance, surface appearance, gloss development, absence of voids, and the like. These problems exist even when the modifier particles are quite small, as when they are made in emulsion, because the processes of isolation from emulsion and incorporation into the matrix polymer cause the particles to aggregate, and they may not be readily dispersed. Such dispersion problems are exemplified in Dunkelberger, U.S. Pat. No. 4,167,405, in which a pre-dispersion of impact-property modifier in a higher viscosity nylon is required to obtain adequate dispersion of the modifier in low molecular weight nylon.

Dunkelberger (U.S. Pat. No. 4,440,905) teaches a class of polymers effective as dispersion aids for impact-property modifiers in poly(vinyl chloride), but does not teach or suggest the compositions of the present invention, nor suggest that his technology may be used to modify nylon. Grigo, U.S. Pat. No. 4,423,186, discloses copolymers of ethylene with (meth)acrylic acid combined with crosslinked butadiene rubbers for improved low-temperature resistance. Albee et. al., U.S. Pat. No. 4,412,040, disclose that neutralized, low-molecular-weight copolymers of ethylene/unsaturated carboxylic acids act as lubricants and dispersing aids in nylon, helping disperse finely divided, dispersible, inert material. This dispersing ability as applied to nylon is not taught.

Japanese Kokai 60/60,158 discloses copolymers of aromatic vinyl monomers with unsaturated carboxylic acids microdispersed in nylon to improve mechanical properties.

Impact-property modifiers which adhere to polyesters and polycarbonates, such as zinc-neutralized ethylene/acrylate/acrylic acid terpolymers, having particle sizes from 0.01 to 3 um and tensile modulus from 7 to 138,000 kPa, are disclosed in Epstein, U.S. Pat. No. 4,172,859.

European Patent Application No. 168,652 (Campbell and Conroy) teaches improved impact-strength resistance for polyphenylene oxide when it is blended with elastomers containing highly polar groups, such as sulfonated polyethylene.

Impact-property modifiers isolated from emulsions by spray-drying or coagulation often are difficult to maintain as free-flowing powders, especially if the modifier is a core-shell polymer with high elastomer content. Several solutions to the problems of sticking to equipment walls, ready compression of the modifier under load, and poor flow in air-veying systems are taught in the literature. Ferry et al. teaches inorganic flow aids and poly(methyl methacrylate) for acrylic- and butadiene-based impact-property modifiers (U.S. Pat. Nos. 3,985,703 and 3,985,794). Grandzol et al. teaches coagulating poly(methyl methacrylate) onto a MBS modifier (U.S. Pat. No. 4,463,131). Neither teaches or suggests the additive of the present invention.

An object of the present invention is to obtain a balance of surface appearance, impact strength and tensile strength in nylon and other thermoplastic polymers which is superior to the balance obtainable with conventional impact modifiers. Another object of the invention is to improve the processing behavior of the impact-property modifiers/polymeric additive combinations with thermoplastic polymer matrices, including those with which the modifiers do and do not react. Other objects will be apparent from the following discussion of the invention.

THE INVENTION

According to the present invention, an acrylic additive polymer containing free carboxylic acid groups is added to an impact-property modifier containing free carboxylic acid groups; when this combination is blended with polyamide matrix polymers the resulting modified polyamide polymers have improved physical properties and color while maintaining gloss and dispersion of the impact-property modifier throughout the matrix.

Another advantage is that the polymer modifier, if of sufficiently high glass-transition temperature, aids the isolation of a soft, rubber-rich impact-property modifier from emulsion, dispersion, or solution.

These advantages are achieved by incorporating with the impact-property modifier, by melt blending, mixing, simultaneous spray drying or other known techniques, from about 0.5 to about 20 weight percent, based on the total weight of modifier and additive polymer, of an acrylic additive copolymer of at least about 50 weight percent, based on total weight of monomers copolymerized to form the copolymer, of an alkyl acrylate or methacrylate, the alkyl group having from 1 to 8 carbon atoms, and from about 5 to about 50 weight percent of a copolymerizable, unsaturated carboxylic acid.

DETAILED DESCRIPTION OF THE INVENTION

The matrix polymers to be improved may be any of a broad class of thermoplastic resins useful for extrusion, thermoforming, or injection molding into useful objects. Preferred are such polymers which are relatively polar in nature, having functional groups such as esters, amides, and the like within their polymer chains, particularly those which are crystalline and are processed as low-viscosity melts, and those which are thermally unstable upon extended processing at high shear and temperature conditions. A more preferred class of polymers is those considered as engineering plastics, such as the polyesters, among which are poly(ethylene terephthalate), poly(butylene terephthalate), and the polyamides or nylons, such as polycaprolactam and poly(hexamethylene adipamide). Particularly preferred are those thermoplastics with reactive amine functionality.

As used herein, the term "polymer" refers to a homopolymer or copolymer; the copolymer may refer to a copolymer of two or more monomers. Where monomers are indicated in relation to a polymer, the polymer is the product of polymerizing the indicated monomers, e.g. a copolymer of butadiene and styrene is produced by copolymerizing butadiene monomer and styrene monomer.

The impact-property modifiers which are to be improved may be any of a broad class of elastomers or encapsulated elastomers, including core-shell polymers. The term "core-shell polymer," as used herein, refers to polymer particles having a core of a first polymer surrounded by one or more shells, or layers, of polymer, each shell polymer being different from any adjacent shell or core polymer, the particles being formed by multi-stage polymerization, such that the shell or shells are covalently bonded to the core and/or adjacent shells. The core is preferably from about 50 to about 90 weight percent conjugated diolefin polymer, as for example a polymer of butadiene, isoprene, chloroprene or dimethylbutadiene; the preferred diolefin is butadiene.

This core polymer is preferably a copolymer of the conjugated diolefin with from about 10 to about 50 parts by weight of an alkyl acrylate, the alkyl group having from 2 to 8 carbon atoms, as for example butyl acrylate or 2-ethylhexyl acrylate, and butyl acrylate being the preferred alkyl acrylate. Alternatively the core is from about 50 to about 95%, preferably from about 70 to about 90%, lower alkyl acrylate, the lower alkyl group having from 2 to 8 carbon atoms and preferably being butyl, and preferably copolymerized with styrene, alpha-methyl styrene or a lower alkyl methacrylate, the lower alkyl group having from 1 to 8 carbon atoms. This core is a rubbery composition having a glass-transition temperature ($T_g$) preferably below −20° C., and is preferably crosslinked using crosslinking techniques well known in the art. The core may also be graftlinked, with or without the presence of crosslinking; graftlinking techniques are similarly well known. As one example, crosslinking or graftlinking monomers, or mixtures thereof, preferably at levels from about 0.1 to about 5%, may be copolymerized with the core monomers. The preferred crosslinking monomers are polyfunctional acrylates and divinylbenzene, and the preferred graftlinking monomer is allyl methacrylate.

The core polymer may, among other processes, be polymerized onto a "seed" polymer, a pre-formed latex polymer of controlled particle size. The seed polymer may be rubbery, as for instance a poly(butadiene) seed onto which is polymerized poly(butyl acrylate) core polymer, or it may be a hard seed, that is, a seed polymer having a glass-transition temperature greater than 20° C., onto which the rubbery core polymer is polymerized. Crosslinking of the seed polymer and grafting of the seed polymer to the core polymer are optional. Such seed polymerization technology is known in the art; see for instance Myers et al, U.S. Pat. No. 3,971,835.

Surrounding the core of the impact-property modifiers are one or more shells of polymer or copolymer, each shell being different from the core or any adjacent additional shells. These shells are preferably copolymers of styrenic monomers, as for example styrene or alpha-methylstyrene, or of acrylonitrile or methacrylonitrile, or of an alkyl acrylate or methacrylate, the alkyl group having from 1 to 8 carbon atoms, the above monomers being copolymerized with from about 0.5 to about 25 parts, preferably from about 1 to about 15 parts, per hundred parts of copolymer, of a first copolymerizable unsaturated carboxylic acid and/or anhydride, preferably methacrylic acid, acrylic acid, itaconic acid or acryloxypropionic acid, or related mers of acryloxypropionic acid having the formula

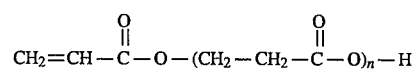

where n is from 1 to 5. Any or all of the shell copolymers may be crosslinked by incorporating into the copolymer a crosslinking monomer; such monomers are well known in the art. A preferred crosslinking monomer is divinylbenzene. Preferred are those core-shell modifiers prepared in emulsion, such as butadiene//styrene/acrylonitrile(ABS) and butadiene-styrene//styrene//methyl methacrylate(MBS), and butyl acrylate//methyl methacrylate. Particularly preferred are those modifiers having reactive acid functionality, such as those taught in Nowak, U.S. Pat. No. 4,474,927, Baer, U.S. Pat. No. 4,584,344 or Owens et al. U.S. Pat. No. 3,668,274.

The additive polymer of the present invention is a copolymer of from about 50 to about 95 parts by weight of an alkyl acrylate or methacrylate, the alkyl group having from 1 to 8 carbon atoms, and from about 5 to about 50 parts, preferably from about 20 to about 40 parts, of a second copolymerizable unsaturated carboxylic acid, as for example acrylic and methacrylic acids. This second acid may be the same as, or different from, the first copolymerizable unsaturated carboxylic acid incorporated into the shell of the impact-property modifier of the present invention. The resulting additive polymer is preferably compatible or miscible with both the matrix polymer and the impact-property modifier, more preferably with the shell or exterior of the impact-property modifier. Particularly preferred are copolymers of methyl methacrylate and methacrylic acid; additional monomers may be included. Molecular weight of the additive polymer may be controlled by known methods, as by adding a chain transfer agent, e.g. a mercaptan, to the polymerization mixture to reduce the molecular weight.

The additive polymer may be mixed with the impact-property modifier by a variety of methods, such as melt-blending, coating the elastomer with the additive polymer by dusting or dry-blending, or co-isolation of the two polymers from a mixed emulsion. The additive polymer may be dried separately and added to a spray drier while the impact-property modifier is being isolated, as taught by Ferry et al, above. The mixture of additive polymer and impact-property modifier may be in the form of a powder, granules or blended pellets.

Pre-blending the additive polymer with the impact-property-modifier polymer prior to mixing with the matrix polymer is preferred, although all three components may be mixed simultaneously. Alternatively, a blend may be prepared of the additive polymer and the impact-property modifier polymer with a small amount of the matrix polymer or a polymer compatible with the matrix polymer; this blend may readily be incorporated into the matrix polymer.

When a tough, rigid polymer is desired, impact-property modifiers are commonly used at levels of about 5 to about 30%, by weight, of the matrix polymer; the additive polymer is incorporated at levels of from about 0.1 to about 15 parts, preferably about 0.1 to about 5 parts, by weight, per hundred parts, by weight, of the impact-property modifier. The components are mixed; for example they may be mixed dry and fed to a plasticizing extruder, a Banbury® mixer, a Brabender® mixer, or the like. The final mixture may be extruded into pellets for further molding, or may be directly processed from the melt into sheet or into molded articles. A preferred use of the mixture is to produce injection-molded articles.

Alternatively, the matrix polymer may be present at from about 5 to about 70% by weight, as a reinforcing polymer in the impact-property modifier blend.

Upon molding or extruding into test specimens, the impact strength is enhanced for the matrix polymer containing the impact-property modifier and additive polymer of the present invention, and the tensile strength, gloss and surface appearance are maintained or enhanced.

A preferred embodiment of the present invention is the use of such additive polymers to improve the impact resistance of nylons; it is especially useful with, but not limited to, the improvement of impact resistance in nylon 6 and nylon 66, using polymers such as those acid-functionalized core-shell polymers taught by Owens et al in U.S. Pat. No. 3,796,771 which is incorporated herein by reference. The techniques of synthesis, isolation, and reactive blending taught therein are particularly useful.

Useful fabricated articles made from thermoplastic polymers which have been improved according to the present invention include toughened sheet and gear moldings for bushings, bearings, housings, electrical tools, automotive parts, electric cases and the like. Owens et al., above, teach use of their core-shell modifier mixed with other modifiers or elastomers having low levels of nylon to form a toughened elastomeric material. The additive modifier of this invention is useful to promote rapid homogenization of such blends. Thus the level of impact-property modifier contemplated in nylon/modifier reacted blends can range from about 5 to about 95%.

The following examples are intended to illustrate the present invention, and not to limit it except as it is limited in the claims. Unless otherwise noted, all proportions used in the specification and claims are by weight and all reagents are of good commercial quality.

EXAMPLE 1

This example illustrates preparation of poly(methyl methacrylate-co-methacrylic acid-co-butyl acrylate) additives of the present invention by emulsion polymerization. The ratio of methyl methacrylate (MMA) to methacrylic acid (MAA) to butyl acrylate (BA) is 56.6/38.3/5.1.

An emulsion of monomers was formed at room temperature with stirring, using the following components.

| | |
|---|---|
| Deionized water | 304 parts |
| Siponate DS-4, 23% solid | 3.16 parts |
| (Sodium dodecylbenzene sulfonate emulsifier) | |
| Butyl acrylate | 42 parts |
| Methyl methacrylate | 461 parts |
| Methacrylic acid | 5.3 parts |

The following solutions were separately made:

| | | |
|---|---|---|
| (A) | Siponate DS-4, 23% solid | 1.92 parts |
| | Water | 11.5 parts |
| (B) | Sodium persulfate | 3.5 parts |
| | Water | 60 parts |
| (C) | Siponate DS-4, 23% solid | 26.4 parts |
| | Water | 12 parts |

To an appropriate reaction vessel equipped with agitator and means for feeding of monomer emulsion and solutions, and swept with inert gas, was charged 1304 parts of deionized water. The kettle was heated to 80° C. Solution (A) was added with stirring. A portion (80.5 parts, 10%) of the monomer emulsion was added to the kettle with stirring, followed by addition of solution (B). An exotherm occured and the temperature was maintained at 80°–82° C. To the remaining monomer emulsion was added, with continued agitation, Solution (C), 307 parts methacrylic acid, and 5 parts water rinse. The emulsion was then fed gradually to the kettle at a rate of 40 parts in 10 minutes for 20 minutes, then at a rate of 85 parts in 10 minutes until the feed was completed. The temperature was controlled at 82°–84° C. through the remainder of this feed. Water (20 parts) was added to rinse the lines and the reaction mixture was allowed to stir for 30 minutes longer; was then cooled, adjusted to 30% solids and filtered. The particle size of the resulting polymer product was 135 nm.

EXAMPLES 2–4

This example illustrates additional acid-containing additives of the present invention.

The following preparations, of lower acid content, were made by a slightly modified version of the process of Example 1. In a similar reactor to that described in Example 1, was charged the indicated amount of water from Table I; the mixture was then swept with nitrogen and heated to 50° C., and the indicated amount of emulsifier solution was added. A small amount of monomer/initiator mixture (C) was added, followed by activator solution (D). After 15 minutes, the remainder of monomer feed (E) was added over a two-hour period; the mixture was then diluted with water to adjust the solids content and cooled. If emulsifier and water are indicated below as present in E, the monomer mixture was pre-emulsified.

TABLE I

| Feeds (parts) | Examples 2 | 3 | 4 |
|---|---|---|---|
| (A) Deionized water | 920 | 485 | 485 |
| (B) 10% Siponate DS-4 | 180 | 300 | 300 |
| (B') Sodium persulfate | — | — | — |
| (C) Methyl methacrylate | 15.3 | 15 | — |
| Methacrylic acid | 2.7 | — | — |
| n-Dodecyl mercaptan | — | — | — |
| t-butylhydroperoxide (70%) | 0.082 | 0.07 | — |
| (D) 2% Sodium formaldehyde sulfoxylate | 55 | 45 | 45 |
| (E) Methyl methacrylate | 290.7 | 240 | 27.5 |
| Methacrylic acid | 51.3 | 45 | 22.5 |
| n-Dodecyl mercaptan | — | — | — |
| t-butylhydroperoxide (70%) | 1.68 | 1.38 | 1.45 |
| Deionized water | — | 420 | 420 |
| 10% Siponate DS-4 | — | 5.2 | 5.2 |
| Results: | | | |
| Solid content, % | 17 | 18.9 | 19.8 |
| pH | 3.4 | 3.6 | 3.7 |
| Particle size, nm. | 116 | 200 | — |

EXAMPLE 5

This example illustrates the preparation of an additive polymer emulsion of the present invention, having a lower molecular weight, (MMA/MAA/n-DDM=70/30/6), where n-DDM indicates n-dodecyl mercaptan.

To an appropriate reaction vessel equipped with agitator and means for feeding monomer emulsion and solutions, and swept with nitrogen, was charged 803 parts of deionized water. The kettle was heated to 85° C. With stirring and with the nitrogen sweep, 4.2 parts of sodium persulfate and 30 parts of a 10% solution of Siponate DS-4 were added. A feed of 60 parts of Siponate DS-4 solution was then begun and continued for 2.5 hours. Simultaneously, a feed mixture of methyl methacrylate(420 parts), methacrylic acid (180 parts) and n-dodecyl mercaptan(36 parts) was added over a three-hour period; the temperature was maintained at 85° C. throughout this addition. After cooling and filtering, the emulsion solids were determined to be 41.5%, the pH 2.05, and the average particle size was 126 nm.

EXAMPLES 6–12

These examples illustrate the preparation of typical impact-property modifiers.

The method of preparation used for the impact-property modifiers was essentially that of Owens et al., U.S. Pat. No. 3,668,274. To a suitable reaction vessel equipped with agitator, means for feeding emulsions of solutions, and a means for sweeping with nitrogen was added

| | |
|---|---|
| Deionized water | 517 parts |
| Seed emulsion | 22.6 parts |
| SFS solution A | 27.5 parts |

The seed emulsion was a butyl acrylate/methyl methacrylate/methacrylic acid terpolymer (BA/MMA/MAA=52/46.7/1.3) at 45.6% solid and the particle size was 100 nm.

The mixture was heated with stirring to 57°–59° C. while the vessel was swept with nitrogen. 73.1 parts (10%) of monomer emulsion (B) was added, followed by 0.088 parts of cumene hydroperoxide (CHP). An exotherm occured, and the temperature rose to about 64° C. Monomer emulsion and CHP were added as indicated in Table II (times are measured from initial addition of monomer). The heat of polymerization was sufficient to maintain the temperature above 55° C. without further heating.

TABLE II

| | Emulsion addition | | CHP addition |
|---|---|---|---|
| Time, min. | parts | % | part |
| 21 | 146.2 | 20 | — |
| 24 | — | — | 0.176 |
| 39 | 292.5 | 40 | — |
| 42 | — | — | 0.351 |
| 65 | 146.2 | 20 | — |
| 67 | — | — | 0.176 |
| 80 | * | 10 | — |
| 82 | — | — | 0.088 |

*Prior to addition of the last 10% of monomer emulsion, 2.74 parts allyl methacrylate and 40.5 parts water were stirred into the monomer emulsion.

After the final exotherm, heat was applied externally to raise the latex temperature to 80° C., and the latex was maintained at that temperature for one hour. The second stage was then polymerized immediately and directly onto the pre-heated core latex.

To the latex was added 23.8 parts of sodium formaldehyde sulfoxylate (SFS) solution (A), and monomer emulsion (C) was added over one hour while maintaining the temperature at 80° C. Portions (23.8 parts) of solution (A) were added at 15, 30, and 45 minutes after commencing the monomer addition.

The resulting latex was chased to high conversion by adding, at 15 minute intervals after monomer addition is completed, 6.0 parts solution (A) and 0.2 part of 70% t-butyl hydroperoxide while maintaining the temperature at 80° C. Stabilizer emulsion (D)(12 parts) was then added and the reaction was allowed to cool. The final polymer latex was present at about 41% solids, and had a particle size of 350–370 nm.

| | |
|---|---|
| Solution (A): | |
| Sodium formaldehyde sulfoxylate | 4 parts |
| Deionized water | 196 parts |
| Monomer emulsion (B): | |
| Butyl acrylate | 543.1 parts |
| Butylene glycol dimethacrylate | 5.5 parts |
| Siponate DS-4 (10% solution) | 4.4 parts |
| Deionized Water | 138.6 parts |
| Monomer emulsion (C): | |

-continued

| | |
|---|---|
| Siponate DS-4, 10% solids | 0.3 part |
| Methyl methacrylate | 140.4 parts |
| Butyl acrylate | 7.2 parts |
| Acryloxypropionic acid | 10.8 parts |
| Stabilizer emulsion (D): | |
| Naugard ® PHR | 4 parts |
| Irganox ® 1076 | 4 parts |
| Siponate DS-4 (28%) | 6 parts |
| Deionized water | 6 parts |

Stabilizer emulsion (D) was made by the following procedures:

i) Charge Naugard PHR (nonyl phenol phosphite, Uniroyal Chemical Co.) and Irganox 1076 (octadecyl-3-(3'-5'-di-tert-butyl-4-hydroxyphenyl)propionate, Ciba-Geigy Corp.) to a flask.

ii) Heat the charge to 70° C.

iii) At 55°–60° C., begin stirring at 1000 rpm using lightning mixer. Continue stirring at this rate throughout reminder of process.

iv) Add Siponate DS-4 (Alcolac Co.) and maintain temperature at 70° C.

v) After five minutes, add deionized water.

vi) Continue stirring for 15–20 minutes.

Table III shows experimental results for replicate preparations of modifiers.

TABLE III

| | Stage I | | | Stage II | | | Final | | | | |
|---|---|---|---|---|---|---|---|---|---|---|---|
| Example | T.S.[1] (%) | Conv. (%) | pH | T.S.[1] (%) | Conv. (%) | pH | T.S.[1] (%) | Conv. (%) | pH | Coagulum (%) | P.S.[2] nm |
| 6 | 42.1 | 99.8 | 3.25 | 41.7 | 99.3 | 3.10 | 41.2 | 100 | 3.6 | 0.08 | 367 |
| 7 | 42.1 | 99.8 | 3.65 | 41.6 | 99.6 | 3.07 | 41.3 | 100 | 3.55 | 0.05 | 265 |
| 8 | 41.9 | 99.3 | 3.05 | 41.8 | 99.5 | 3.05 | 41.0 | 99.5 | 3.45 | 0.07 | 361 |
| 9 | 41.5 | 98.3 | 3.12 | 41.2 | 98.3 | 3.10 | 41.0 | 99.5 | 3.49 | 0.04 | 360 |
| 10 | 42.0 | 99.5 | 3.00 | 41.6 | 98.6 | 2.96 | 41.0 | 99.5 | 3.42 | 0.08 | 330 |
| 11 | 42.0 | 99.5 | 3.15 | 42.0 | 99.5 | 3.07 | 41.2 | 100 | 3.40 | 0.09 | 341 |
| 12 | 41.7 | 99.8 | 3.15 | 41.0 | 99.2 | 3.06 | 40.6 | 99.7 | 3.40 | 0.09 | 320 |

[1]T.S. = Total Solids
[2]P.S. = Particle Size

Modifiers of different particle size can be easily made by adjusting the seed or soap concentration, or both.

EXAMPLES 13–26

These examples illustrate procedures for blending modifiers with the additive polymer of the present invention.

a) Spray-drying

Spray drying is the transformation of a wet material into a dried, particulate form, e.g. powders, granules or agglomerates by spraying the material into a hot drying median. It is a one-step, continuous particle-processing operation well known to those skilled in the art. Details of the process may be found in *Spray Drying Handbook*, 3rd edition, K. Masters, editor, 1972, John Wiley & Sons.

To 100 parts solids weight of the core-shell impact-property modifier latex prepared in Example 12 was added from 2.5 to 10 parts solids weight of the additive polymer of the present invention from Example 1 as indicated in Table IV. The mixture was stirred for 15 minutes, and dried to form a powder using a Niro Atomizer™ Mobile Minor Spray Drier. The operating conditions were as follows:

Inlet temperature: 140° C.

Outlet temperature: 60° C.

The examples in Table IV illustrate the improvement in spray drying and impact resistance of nylon 6 obtained by adding different amounts of the additive of the present invention into the latex of impact-property modifiers.

TABLE IV

| Example | Impact Modifier | Additive Polymer | Dusting Ratio[1] | Notched Izod Impact Joules/meter, 23° C.[2] 3.2 mm notch |
|---|---|---|---|---|
| 13 | 100 pts. | 0 pt. | 60/40 | 961 |
| 14 | 100 pts. | 2.5 pts. | 90/10 | 1121 |
| 15 | 100 pts. | 3.0 pts. | 90/10 | 1121 |
| 16 | 100 pts. | 5.0 pts. | 90/10 | 1121 |
| 17 | 100 pts. | 7.5 pts. | 90/10 | 1174 |
| 18 | 100 pts. | 10.0 pts. | 90/10 | 1174 |

[1]Product/dustings ratio in the spray drier. (Weight ratio of collected product to material scraped from dryer walls.)
[2]Notched Izod impact resistance was measured on test pieces of nylon 6 matrix polymer (Capron ® 8202) containing 30% modifier, prepared using a 2.5-cm Killion single-screw extruder equipped with a two-stage, high work screw.

b) Dry Blending

To 100 parts by weight of the spray-dried impact-property modifier of Example 12 was added the amount indicated in Table V of the separately spray-dried additive polymer of the present invention. The mixture was stirred for thirty seconds in a Waring® blender.

The examples in Table V illustrate the effect on impact strength of the impact-property modifier/nylon 6 blend with and without the additive polymers of the present invention.

TABLE V

| | | | Notched Izod Impact Joules/meter, 23° C. notch | |
|---|---|---|---|---|
| Example | Impact Modifier | Additive Polymer | 3.2 mm | 6.4 mm |
| 19 | 100 pts. | 0 pt. | 907 | 747 |
| 20 | 100 pts. | 3 pts. | 1068 | 907 |
| 21 | 100 pts. | 5 pts. | 1121 | 1014 |

Notched Izod test pieces were blended at a 30% loading of modifier in nylon 6 (Capron 8202) matrix polymer, using double-pass extrusion in a 2.5-cm Killion single-screw extruder.

c) Blending With Other Flow Improvers

To 100 parts by weight of the spray dried impact-property modifier prepared in Example 12 which contain 5% of the additive polymer of the present invention was added from 0.4 to 2.0% of Cab-O-Sil® fumed silica as an additional flow improver, either during or after spray drying. Table VI shows the effect of the added Cab-O-Sil® silica on impact strength.

TABLE VI

| | | | Notched Izod Impact Joules/meter, 23° C. notch | |
|---|---|---|---|---|
| | Impact | | | |
| Example | Modifier | Cab-O-Sil | 3.2 mm | 6.4 mm |
| 22 | 100 parts | 0 part | 907 | 747 |
| 23 | 100 parts | 0.4 part | 907 | 747 |
| 24 | 100 parts | 0.8 part | 854 | 267 |
| 25 | 100 parts | 1.4 parts | 854 | 212 |
| 26 | 100 parts | 2.0 parts | 641 | 212 |

Notched Izod impact resistance was measured on test pieces of nylon 6 matrix polymer (Capron® 8202) containing 30% modifier, prepared using a 2.5-cm Killion single-screw extruder equipped with a two-stage, high work screw.

These results show that low levels of fumed silica (below 0.5%) do not degrade the impact strength.

EXAMPLES 27–32

These examples illustrate use of the improved modifiers of the present invention to improve the physical properties of nylons.

a) Separately Pelletized Impact-Property Modifier

The spray-dried impact-property modifier powder of Example 16 containing 5% of the additive polymer of the present invention was extruded through a 2.5-cm Killion single-screw extruder at 100 rpm and 200–230 extrudate was cooled in a cool water bath, and then pelletized. These pellets may be directly used in blending extrusion with nylon plastics without further drying.

b) Processing by Single-Screw Extruder

Mixtures of impact-property modifier containing 5% of the additive polymer of the present invention and nylon 6 (Capron 8202) were extruded through a 2.5-cm Killion single-screw extruder; the residence time of the mixtures in the extruder was about 2 minutes. The extrusion conditions are listed as follows:

2.5 cm Killion single-screw extruder with 24 L/D ratio
Two-stage vacuum-vented screw with compression ratio of 3.5:1

| | |
|---|---|
| Single-strand die | |
| Screw speed of 100 rpm (100 grams/minute throughput) | |
| Feeding zone: | 250° C. |
| Compression zone: | 255° C. |
| Metering zone: | 260° C. |
| Die temperature: | 260° C. |

Material dried overnight at 65° C. in vacuum prior to extrusion

Doubled-pass blended

Incorporating the additive polymer of the present invention into the modifier/nylon 6 (30/70) blend improves impact strength and tensile modulus of even single-pass blends from a single-screw extruder, as shown in Table VII.

TABLE VII

| Example | Modifier Composition | Notched Izod Impact Joules/meter, 23° C. 3.2 mm notch | Tensile Modulus, kPa |
|---|---|---|---|
| 27 | Modifier of Example 12 + 0.4% Fumed Silica[1] | 800 (Hinged) 320 (Clean) | 1,165,000 |
| 28 | Modifier of Example 12 + 5% polymer of Example 1 | 1014 | 1,420,000 |
| 29 | Unmodified Nylon 6 | 53 | 1,448,000 |

[1]Fumed silica was added to help prevent the modifier from adhering to the dryer walls.

The modifier was pelletized and single-pass blended at 30% loading with nylon 6 (Capron 8202) using a 2.5-cm Killion single-screw extruder equipped with a two-stage, high-work screw.

c) Processing by Twin-screw Extruder.

A mixture of impact-property modifier of Example 12 containing 5% of the additive polymer of Example 1 of the present invention and nylon 6 (Capron 8202) was extruded through a twin-screw mixing extruder; the residence time of the mixture in the extruder was about 4 minutes. The extrusion conditions are listed as follows:

American Leistritz twin-screw extruder with counter-rotating screws

| | |
|---|---|
| Single-strand die | |
| Screw speed of 90 U (80 rpm) | |
| Zone 2: | 240° C. |
| Zone 3: | 250° C. |
| Zone 4: | 250° C. |
| Zone 5: | 250° C. |
| Die temperature: | 250° C. |

Impact-property modifier was pelletized and dried under vacuum at 65° C. before blending with nylon 6

Single-pass blend d) Molding by Injection

The single-pass, twin-screw and double-pass, single-screw blended pellets of modifier/nylon 6 were dried in a vacuum oven at 65°–70° C. overnight before molding. The injection molding conditions are listed as follows:

Newbury™ Injection Molding Machine 30-RS, 28-gram shot size

Barrel Temperature: 255° C.

Mold Temperature: 99° C.

Cycle Time: 45 seconds

The injection-molded parts were used for the characterization and measurement of impact resistance, mechanical and physical properties, etc. of the modified polymer.

The typical test results for modified nylon 6 may be compared with the unmodified nylon 6 (Capron 8202) in Table VIII.

TABLE VIII

| Modifier Composition | Notched Izod Impact Joules/meter, 23° C. | Elongation at Break | Tensile Strength | Tensile Modulus |
|---|---|---|---|---|

| Example | 30 parts | 3.2 mm | 6.4 mm | (%) | (kPa) | (kPa) |
|---|---|---|---|---|---|---|
| 30 | Unmodified | 53 | 53 | 168 | 48,900 | 1,385,000 |
| 31 | 30 Parts Modifier of Ex. 12 | 907 | 747 | 244 | 48,200 | 1,447,000 |
| 32 | 30 parts of blend: 95% Modifier of Ex. 12 + 5% Additive of Ex. 1 | 1174 | 961 | 210 | 71,700 | 1,929,000 |

EXAMPLES 33–39

Blends at various concentrations of the modifiers of Examples 13 and 16 with nylon 6 (Akulon M-223 D injection molding grade, from Akzo N.V.) were made in a co-rotating twin screw Werner-Pfleiderer ZSK 30 extruder at 253° to 273° C.; throughput rates varied from 11 to 22 kg/hr. The resulting pellets were re-melted at similar melt temperatures and re-molded in a mold heated to 70 degrees C. Results of physical property of dry, as-molded samples testing are reported in Table IX.

of Example 1 may be fed to a twin-screw, Welding Engineers devolatizing extruder as taught in U.S. Pat. No. 3,751,527 and coagulated with 1.0 parts of a dilute solution of calcium hypophosphite or magnesium sulfate. The extruder would typically operate with the coagulation zone at 100° C., the dewatering zone at 160° C. and the devolatilizing zone at 200° C., and would be equipped with a strand die. The extruded strand may be cut into pellets for incorporation into nylon.

TABLE IX

| Example | Modifier Example | Additive Polymer % of blend | Notched Izod 3.2 mm, J/m 23° C. | -20° C. | Impact Strength Tests U-Notched Charpy (kJ/m$^2$) 23° C.[1] | -20° C.[1] | 23° C.[2] | Tensile Modulus MPa |
|---|---|---|---|---|---|---|---|---|
| 33 | 0 | — | 53 | 44 | 9 | 9 | 4 | 2830 |
| 34 | 13 | — | 190 | 18 | 18 | 12 | — | 2492 |
| 35 | 16 | 0.5 | 215 | 19 | 19 | 11 | — | 2554 |
| 36 | 13 | — | 780 | 46 | 46 | 17 | — | 2115 |
| 37 | 16 | 1.0 | 870 | 45 | 45 | 17 | — | 2135 |
| 38 | 13 | — | 1080 | 59 | 59 | 20 | 51 | 1698 |
| 39 | 16 | 1.5 | 170 | 64 | 64 | 19 | 49 | 1727 |

[1]molded notch
[2]milled notch

EXAMPLE 40–44

The blends of Examples 33–39 were repeated using nylon 66 (Akulon S-223 D injection molding grade, from Akzo N.V.) as the matrix polymer. The melt temperature was approximately 285° C., and throughput rates from 10 to 22 kg/hr were used. Samples were molded and tested as in Examples 33–39.

TABLE X

| Example | Modifier of Example No. | Modifier Weight % | Notched Izod Impact 3.2 mm, 23° C. J/m |
|---|---|---|---|
| 40 | — | 0 | 40 |
| 41 | 16 | 10 | 170 |
| 42 | 16 | 20 | 211 |
| 43 | 16 | 30 | 175 |
| 44 | 13 | 30 | 383 |

EXAMPLE 45

This example illustrates that the impact-property modifier and additive polymer of the present invention may be coagulated together from emulsion, melted and extruded to form a pelleted additive for improving the physical properties of nylon. A mixture of 100 parts solids weight of an emulsion of the impact-property modifier of Examples 3 and 5 parts solids weight of an emulsion of the additive polymer

EXAMPLE 46

As an alternative method of introducing the physical property modifiers of the present invention to nylon polymers, a concentrated blend of the modifiers with a nylon polymer may be made, and the concentrated blend subsequently added to nylon polymer. This example illustrates such a method.

Nylon 6 pellets may be mixed with pellets made according to Example 45 at weight ratios of 70/30, 80/20 and 90/10. The mixtures may be melted and extruded into strands from an American Leistritz twin-screw extruder at a melt temperature of 225° C., and the strands may be cut into pellets. Such pellets are suitable for blending with nylon, or they may be molded themselves in a Newbury molding machine at a melt temperature of 225° C., a mold temperature of 120° C., a pressure of 2500 kPa and a mold time of 36 seconds, to form a tough, flexible material.

We claim:
1. An impact modifier for polyamide which comprises
   A) from about 80 to about 99 weight %, based on the total weight of impact modifier, of a core-shell impact modifier polymer having
      i) from about 50 to about 90 weight %, based on the total weight of core-shell impact modifier polymer, of a rubbery core polymer of conjugated diolefin or alkyl acrylate having 2 to 8 carbon atoms in the alkyl group, or mixture thereof, having a glass-transition temperature below −20° C., and ii) from about 10 to about 50 weight %, based on the total weight of core-shell impact modifier polymer, of one or more shells of polymer, each shell being different from the core or any adjacent shell, at least one of the shells being a copolymer of
    a) a monomer selected from styrenic monomers, acrylonitrile, methacrylonitrile, alkyl esters of acrylic or methacrylic acid, the alkyl group having from 1 to 8 carbon atoms and mixtures thereof with
    b) from about 0.5 to about 25 weight %, based on the total weight of the shell copolymer, of a first copolymerizable unsaturated carboxylic acid, a copolymerizable unsaturated carboxylic anhydride or mixtures thereof, and B) from about 1 to about 20 weight %, based on the total weight of impact modifier, of an additive copolymer consisting essentially of about 5 weight %, based on the total weight of additive copolymer, of an alkyl acrylate having from 1 to 8 carbon atoms in the alkyl group, about 57 weight %, based on the total weight of additive copolymer, of methyl methacrylate, and about 38 weight %, based on the total weight of additive copolymer, of a second copolymerizable unsaturated carboxylic acid, wherein the second copolymerizable unsaturated carboxylic acid may be the same as, or different from, the first copolymerizable unsaturated carboxylic acid, wherein the Notched Izod of the additive copolymer is about 9 joules/meter, at 23° C. and the tensile modulus of the additive copolymer is about 678,000 psi.

2. The impact modifier of claim 1 wherein the core-shell impact modifier polymer is present at a level from about 90 to about 98 weight %, based on the total weight of impact modifier, with from about 2 to about 10 weight %, based on the total weight of impact modifier, of the additive copolymer.

3. The impact modifier of claim 1 wherein the core polymer is a conjugated diolefin polymer.

4. The impact modifier of claim 3 wherein the conjugated diolefin is butadiene.

5. The impact modifier of claim 4 wherein the core polymer is a copolymer of from about 70 to about 95 weight % butadiene.

6. The impact modifier of claim 5 wherein the core polymer is a copolymer of from about 70 to about 95 weight % of butadiene copolymerized with from about 5 to about 30 weight % of one or more additional monomers selected from the group consisting of styrene, acrylonitrile, an alkyl ester of acrylic acid and an alkyl ester of methacrylic acid, the alkyl group having from 1 to 8 carbon atoms.

7. The impact modifier of claim 5 wherein the core polymer is crosslinked.

8. The impact modifier of claim 5 wherein the core polymer is crosslinked with from about 0.1 to about 5 weight % of a polyethylenically unsaturated crosslinking monomer.

9. The impact modifier of claim 7 wherein the crosslinking monomer is divinylbenzene.

10. The impact modifier of claim 7 wherein the crosslinking monomer is butylene glycol dimethacrylate.

11. The impact modifier of claim 1 wherein the core polymer is a polymerized alkyl acrylate, the alkyl group having from 2 to 8 carbon atoms.

12. The impact modifier of claim 11 wherein the core polymer is a copolymer of from about 70 weight % to about 90 weight % of the alkyl acrylate.

13. The impact modifier of claim 11, wherein the rubbery core polymer of the alkyl acrylate is a polymer of n-butyl acrylate.

14. The impact modifier of claim 11 wherein the core polymer is crosslinked.

15. The impact modifier of claim 14 wherein the core polymer is crosslinked with from about 0.1 to about 5 weight % of a polyethylenically unsaturated crosslinking monomer.

16. The impact modifier of claim 15 wherein the crosslinking monomer is butylene glycol dimethacrylate.

17. The impact modifier of claim 15 wherein the crosslinking monomer is divinylbenzene.

18. The impact modifier of claim 1 wherein the glass-transition temperature of the core polymer is below −20° C.

19. The impact modifier of claim 1 wherein the shell polymer is a polymer of a monomer selected from the group consisting of styrene, methylstyrene, an alkyl acrylate or methacrylate wherein the alkyl group contains from 1 to 4 carbon atoms, acrylonitrile, methacrylonitrile and mixtures thereof.

20. The impact modifier of claim 19 wherein the shell polymer is a polymer of methyl methacrylate.

21. The impact modifier of claim 19 wherein the shell polymer is a copolymer of styrene and acrylonitrile.

22. The impact modifier of claim 1 wherein the shell copolymer is a copolymer of at least about 60 weight % methyl methacrylate and from about 1 to about 15 weight % of the first copolymerizable, unsaturated acid.

23. The impact modifier of claim 1 wherein the first copolymerizable, unsaturated acid is selected from the group consisting of acrylic acid, methacrylic acid and itaconic acid.

24. The impact modifier of claim 1 wherein the first copolymerizable, unsaturated acid has the formula

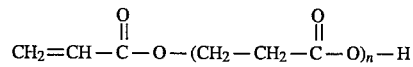

where n is from 1 to 5.

25. The impact modifier of claim 1 wherein the shell polymer is grafted to the core polymer.

26. The impact modifier of claim 25 wherein the shell polymer is grafted to the core polymer by incorporation of from about 0.5 to about 5 weight % of the total weight of shell polymer, of allyl methacrylate into the core polymer.

27. The impact modifier of claim 1 wherein the core-shell impact modifier polymer is present at from about 90 to about 98 weight % and the additive copolymer is present at from about 2 to about 10 weight %.

28. The impact modifier of claim 1 wherein the impact modifier is a mixture of A and B.

29. The impact modifier of claim 1 wherein the impact modifier is a melt blend of A and B.

30. The impact modifier of claim 29 wherein the melt blend is in the form of pellets.

* * * * *